(12) United States Patent
Yamanaka et al.

(10) Patent No.: US 6,857,280 B1
(45) Date of Patent: Feb. 22, 2005

(54) AIR CONDITIONER

(75) Inventors: Yasushi Yamanaka, Kariya (JP); Yoshitaka Tomatsu, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/736,876

(22) Filed: Dec. 16, 2003

(51) Int. Cl.[7] .............................................. F25B 41/04
(52) U.S. Cl. ...................................... 62/205; 62/206
(58) Field of Search ........................ 62/174, 205, 206, 62/216, 222, 515, 516, 520, 522, 523, 524

(56) References Cited

U.S. PATENT DOCUMENTS

| | | | | |
|---|---|---|---|---|
| 1,782,687 A | * | 11/1930 | Hoffman | 62/205 |
| 2,148,412 A | * | 2/1939 | Conrad | 62/224 |
| 2,245,454 A | * | 6/1941 | Baker | 62/212 |
| 2,326,093 A | * | 8/1943 | Carter | 62/197 |
| 2,331,264 A | * | 10/1943 | Carter | 62/206 |
| 4,081,971 A | * | 4/1978 | Eber | 62/216 |
| 6,422,308 B1 | * | 7/2002 | Okawara et al. | 165/202 |
| 6,477,848 B1 | * | 11/2002 | Domyo et al. | 62/114 |
| 6,481,229 B1 | * | 11/2002 | Yajima et al. | 62/225 |
| 6,550,265 B2 | * | 4/2003 | Takeuchi et al. | 62/324.2 |
| 6,584,796 B2 | * | 7/2003 | Itoh et al. | 62/324.1 |
| 6,748,755 B2 | * | 6/2004 | Kubo et al. | 62/225 |

FOREIGN PATENT DOCUMENTS

| | | | |
|---|---|---|---|
| EP | 000188957 A1 | * | 7/1986 |
| JP | 411037588 A | * | 2/1999 |

* cited by examiner

*Primary Examiner*—William E. Tapolcai
*Assistant Examiner*—Mohammad m. Ali
(74) *Attorney, Agent, or Firm*—Harness, Dickey & Pierce, PLC

(57) ABSTRACT

By the use of the suction pressure of a compressor, the pressure in back pressure chambers 71g and 71h are reduced to open a refrigerant inlet side and a refrigerant outlet side of an evaporator, and when the compressor is at rest, by the use of a first coil spring 76 and a second coil spring 77, the refrigerant inlet side and the refrigerant outlet side of the evaporator 40 are closed mechanically. Due to this, it is possible to minimize a refrigerant leak by the use of an inexpensive means.

4 Claims, 3 Drawing Sheets

AIR CONDITIONER

BACKGROUND OF THE INVENTION

1. Field of the Invention

The present invention relates to an air conditioner and a refrigerant path switching valve for an air conditioner.

2. Description of the Related Art

If a refrigerant leak occurs in an indoor heat exchanger for effecting heat exchange with air which is blown into a compartment, in an air conditioner utilizing a vapor compression type refrigerator, people in the compartment may take in a considerable amount of the leaked refrigerant. Particularly, when a flammable gas such as a propane gas, carbon dioxide, or the like, is used as a refrigerant, the human body may be adversely affected.

One measure against a refrigerant leak is to provide an electromagnetic valve on the refrigerant inlet side of an indoor heat exchanger in order to minimize a refrigerant leak by closing the electromagnetic valve when the refrigerant leak is detected by a refrigerant sensor arranged in a compartment, but this measure requires an electromagnetic valve and a control circuit for controlling the electromagnetic valve, therefore, there is the possibility that the manufacturing cost of an air conditioner will be raised considerably.

SUMMARY OF THE INVENTION

The present invention has been developed with the above-mentioned problem being taken into account, and the first object is to provide a new air conditioner different from a conventional one and the second object is to minimize a refrigerant leak by the use of an inexpensive means.

In order to attain the above-mentioned objects, an air conditioner according to a first aspect of the present invention comprises: a compressor (10) for sucking and compressing a refrigerant; an outdoor heat exchanger (20) for effecting heat exchange between a refrigerant and outdoor air; a pressure-reducing means (30) for reducing the pressure of and expanding a high pressure refrigerant; an indoor heat exchanger (40) for effecting heat exchange between a refrigerant and air which is blown into a compartment; an inlet side switching valve (71a, 71b, 72, 73, 71e, 71g) for opening and closing a refrigerant path on the refrigerant inlet side of the indoor heat-exchanger (40); and an outlet side switching valve (71c, 71d, 74, 75, 71f, 71h) for opening and closing a refrigerant path on the refrigerant outlet side of the indoor heat exchanger (40); wherein both the switching valves (71a, 71b, 72, 73, 71e, 71g, 71c, 71d, 74, 75, 71f, 71h) open the refrigerant paths (72, 74) by the use of the pressure produced by the compressor (10) and close the refrigerant paths (72, 74) by the use of the elastic force of elastic means (76, 77) when the compressor (10) comes to a stop.

Due to this, it is possible to obtain a new air conditioner different from a conventional one and, at the same time, to minimize a refrigerant leak by the use of a less expensive means than the means described in "2. Description of the Related Art", because the refrigerant inlet side and the refrigerant outlet side of the indoor heat exchanger (40) are closed mechanically.

While the compressor (10) is at rest, as the refrigerant inlet side and the refrigerant outlet side of the indoor heat exchanger (40) are closed, it is possible to prevent without fail the inside of a compartment from being filled with a large amount of refrigerant even if a refrigerant leak occurs when power is not supplied for a long period.

An air conditioner according to a second aspect of the present invention is characterized in that both the switching valves (71a, 71b, 72, 73, 71e, 71g, 71c, 71d, 74, 75, 71f, 71h) open the refrigerant paths (72, 74) by the use of the suction pressure of the compressor (10).

An air conditioner according to a third aspect of the present invention is characterized in that the inlet side switching valve (71a, 71b, 72, 73, 71e, 71g) and the outlet side switching valve (71c, 71d, 74, 75, 71f, 71h) are formed integrally.

An air conditioner according to a fourth aspect of the present invention comprising a compressor (10) for sucking and compressing a refrigerant, an outdoor heat exchanger (20) for effecting heat exchange between a refrigerant and outdoor air, a pressure-reducing means (30) for reducing the pressure of and expanding a high pressure refrigerant, and an indoor heat exchanger (40) for effecting heat exchange between a refrigerant and air which is blown into a compartment; wherein a switching valve for opening and closing refrigerant paths on a refrigerant inlet side and a refrigerant outlet side of the indoor heat exchanger (40); wherein the switching valve comprises: valve elements (73, 75) for opening and closing the refrigerant paths (72, 74); elastic means (76, 77) for exerting an elastic force on the valve elements (73, 75) in a direction to close the refrigerant paths; and a valve body (71) making up, together with the valve elements (73, 75), back pressure chambers (71g, 71h) communicating with the suction side of the compressor (10); and wherein the refrigerant paths (72, 74) are constituted so as to open when the valve elements (73, 75) are displaced in such a direction to reduce the volume of the back pressure chambers (71g, 71h).

Due to this, it is possible to minimize a refrigerant leak by the use of a less expensive means than the means described in "2. Description of the Related Art", because the refrigerant inlet side and the refrigerant outlet side of the indoor heat exchanger (40) are closed mechanically.

While the compressor (10) is at rest, as the refrigerant inlet side and the refrigerant outlet side of the indoor heat exchanger (40) are closed, it is possible to prevent without fail the inside of a compartment from being filled with a large amount of refrigerant even if a refrigerant leak occurs when power is not supplied for a long period.

Symbols, within the brackets, following each means are an example relationship of correspondence with the concrete means in the embodiments to be described later.

The present invention may be more fully understood from the description of the preferred embodiments of the invention set forth below, together with the accompanying drawings.

DESCRIPTION OF THE PREFERRED EMBODIMENTS

Figure 1:
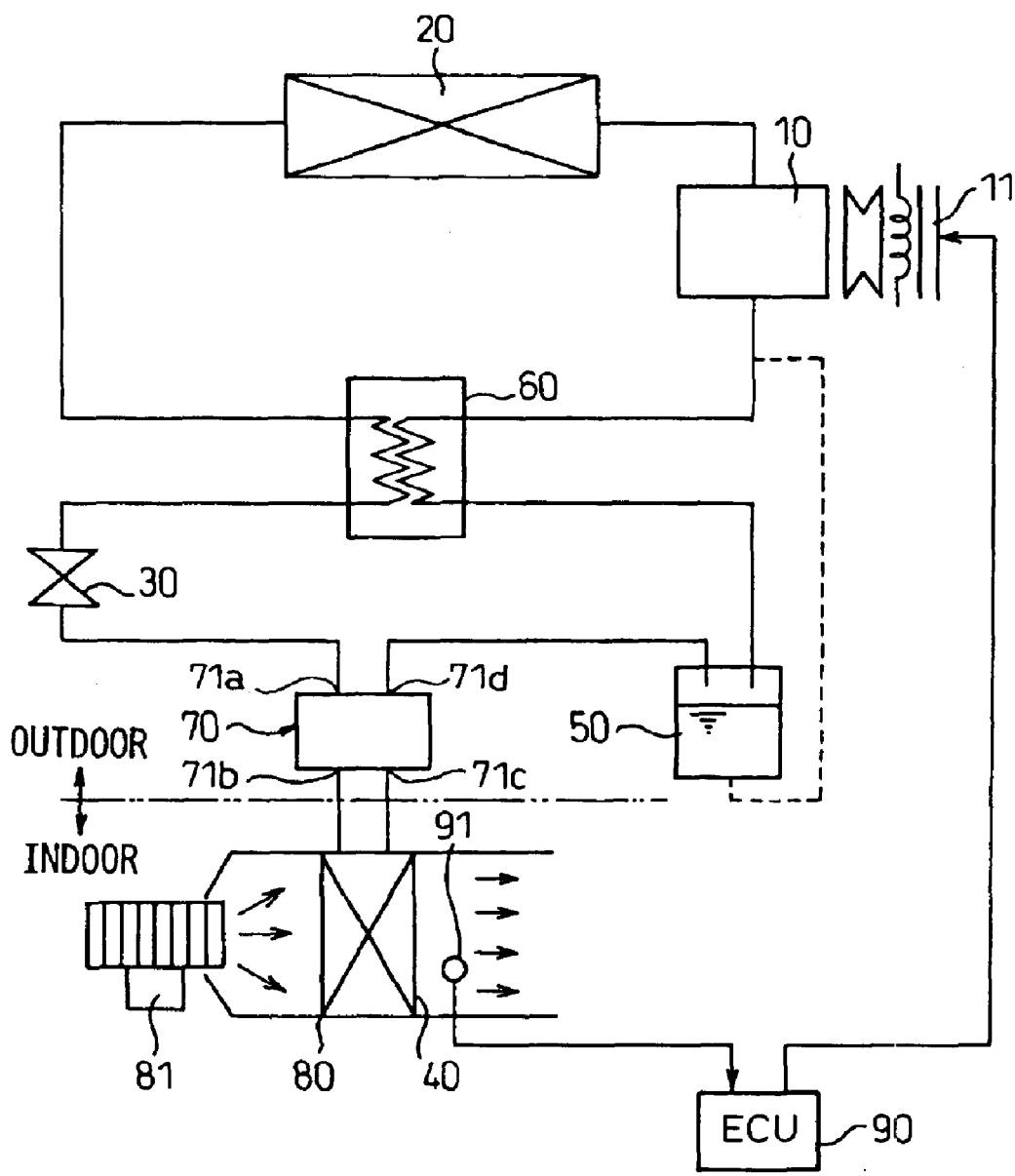
FIG. 1 is a schematic diagram of an air conditioner according to an embodiment of the present invention.

In the present embodiment, an air conditioner according to the present invention is applied to a vehicle air conditioner, and FIG. 1 is a schematic diagram of an air conditioner according to the present embodiment.

A compressor 10 receives the driving force from an engine, which serves as a traveling drive source, via an electromagnetic clutch 11 and sucks and compresses a refrigerant, and a radiator 20 is an outdoor heat exchanger for cooling a refrigerant by effecting heat exchange between outdoor air and the high pressure refrigerant discharged from the compressor 10.

An expansion valve 30 is a pressure-reducing means for reducing the pressure of, and expanding, a high pressure refrigerant and the expansion valve 30 controls the pressure of the refrigerant on the high pressure side, that is, an opening degree of a throttle based on the temperature of the high pressure side refrigerant (the temperature of the refrigerant on the outlet side of the radiator 20 in the present embodiment) in order to maintain a high coefficient of performance of a vapor compression type refrigerator.

As carbon dioxide is used as a refrigerant in the present embodiment, when the air-conditioning load is large, for example in summer, the required cooling performance is ensured by raising the pressure of the high pressure refrigerant to more than the critical pressure of the refrigerant, and when the air-conditioning load is small, for example in spring or autumn, the pressure of the high pressure refrigerant is kept below the critical pressure of the refrigerant.

An evaporator 40 is an indoor heat exchanger which is contained in an air-conditioning casing 80 mounted inside a vehicle compartment and cools air which is blown into the compartment by effecting heat exchange between the air which is blown into the compartment and the low pressure refrigerant whose pressure is reduced by the expansion valve 30 to evaporate the liquid phase refrigerant.

An accumulator 50 is a gas-liquid separator which separates the refrigerant, which flows out from the evaporator 40, into the liquid phase refrigerant and the gas phase refrigerant and stores the excess refrigerant as a liquid phase refrigerant and, at the same time, supplies the gas phase refrigerant to the suction side of the compressor 10. An internal heat exchanger 60 is a heat exchanger which effects heat exchange between the high pressure refrigerant before its pressure is reduced by the expansion valve 30 and the low pressure refrigerant to be sucked by the compressor 10.

A safety valve 70 is a refrigerant path switching valve of a mechanical type which brings the evaporator 40 into a hermetically closed state by closing the refrigerant inlet side and the refrigerant outlet side of the evaporator 40 when the compressor 10 is at rest. The safety valve 70 will be described in detail later.

An air blower 81 is an air blowing means for sending a current of air for air conditioning into a compartment, and on the upstream side of the current of air from the air blower 81, an indoor/outdoor air switching device which switches between one case where indoor air is guided into the air blower 81 and the other case where outdoor air is guided into the air blower 81 is provided.

Moreover, in the vicinity of the evaporator 40 within the air conditioning casing 80, a refrigerant leak sensor 91 which detects a refrigerant is provided, and an electronic control unit (ECU) 90 stops the compressor 10 by shutting off the current to the electromagnetic clutch 11 when the refrigerant leak sensor 91 detects a refrigerant.

By the way, as carbon dioxide is used as a refrigerant in the present embodiment, the refrigerant leak sensor 91 and the ECU 90 directly detect carbon dioxide in air and judge that the refrigerant has leaked out when the concentration of carbon dioxide exceeds a fixed concentration.

Next, the safety valve 70 is described below.

Figure 2:
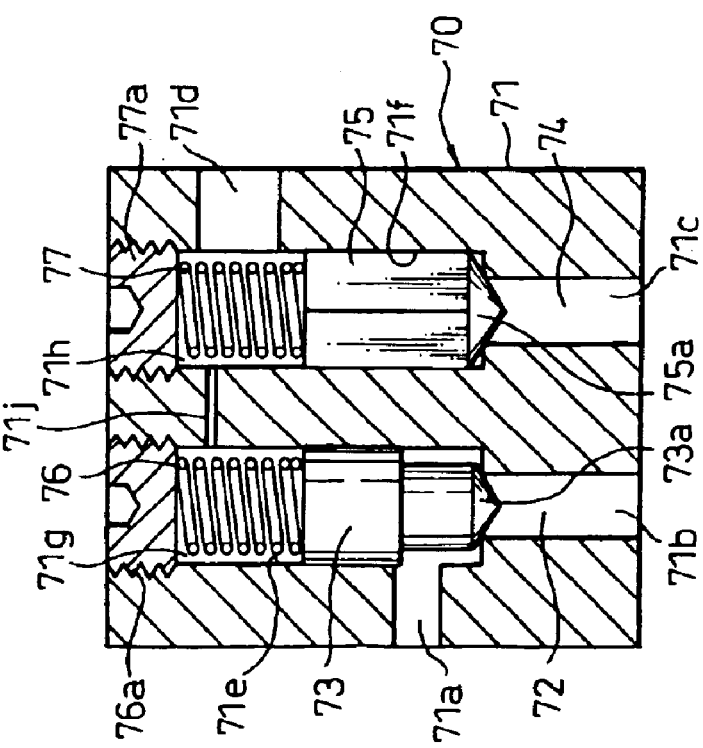
FIG. 2A is a diagram illustrating a safety valve according to an embodiment of the present invention.
FIG. 2B is a diagram illustrating a safety valve according to an embodiment of the present invention.

FIG. 2A shows a state in which the refrigerant inlet side and the refrigerant outlet side of the evaporator 40 are closed, and FIG. 2B shows a state in which the refrigerant inlet side and the refrigerant outlet side of the evaporator 40 are open.

In a valve body 71, a first inflow port 71a to be connected to the refrigerant outlet side of the expansion valve 30, a first outflow port 71b to be connected to the refrigerant inlet side of the evaporator 40, a second inflow port 71c to be connected to the refrigerant outflow side of the evaporator 40, and a second outflow port 71d to be connected to the refrigerant inlet side of the accumulator 50 are formed.

It is preferable to make the valve body 71 of a material such as a resin whose coefficient of thermal conductivity is low, but when a resin cannot provide the required strength, the valve body 71 may be made of metal.

A refrigerant path 72 which connects the first inflow port 71a and the first outflow port 71b is provided with a first valve element 73 which opens and closes the refrigerant path 72 and a refrigerant path 74 which connects the second inflow port 71c and the second outflow port 71d is provided with a second valve element 75 which opens and closes the refrigerant path 74.

Figure 3:
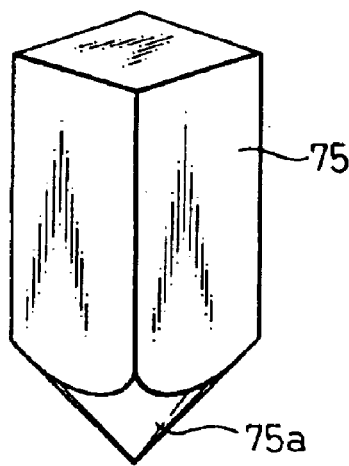
FIG. 3 is a perspective view of a valve element of a safety valve according to an embodiment of the present invention.

The first valve element 73 is column-shaped and has a conically tapered portion 73a formed on the end face in the axial direction, and the second valve element 75 is prism-shaped and has a conically tapered portion 75a formed on the end face in the axial direction (refer to FIG. 3).

Moreover, in the valve body 71, a first cylinder portion 71e in which the first valve element 73 is contained slidably and a second cylinder portion 71f in which the second valve element 75 is contained slidably are formed, and both the cylinder portions 71e and 71f have a column-shaped space whose cross section is a circle.

In the space in the first cylinder portion 71e opposite to the tapered portion 73a, a first coil spring 76, which exerts an elastic force on the first valve element 73 in the direction to close the refrigerant path 72, is contained and, similarly, in the space in the second cylinder portion 71f opposite to the tapered portion 75a, a second coil spring 77, which exerts an elastic force on the second valve element 75 in the direction to close the refrigerant path 74, is contained.

A first cap 76a, which adjusts the initial load of the first coil spring 76, is a screw lid to block the first cylinder portion 71e, and a second cap 77a, which adjusts the initial load of the second coil spring 77, is a screw lid to block the second cylinder portion 71f.

A second back pressure chamber 71h, in which the second coil spring 77 is contained, within the second cylinder portion 71f communicates with the second outflow port 71d, that is, the suction side of the compressor 10, and a first back pressure chamber 71g, in which the first coil spring 76 is contained, within the first cylinder portion 71e communicates with the second back pressure chamber 71h via a communication path 71j and, as a result, communicates with the suction side of the compressor 10.

In the present embodiment, the first inflow port 71a, the first outflow port 71b, the refrigerant path 72, the first valve element 73, the first cylinder portion 71e, the first back pressure chamber 71g, and the like, make up the inlet side switching valve set forth in claims, and the second inflow port 71c, the second outflow port 71d, the refrigerant path 74, the second valve element 75, the second cylinder portion 71f, the second back pressure chamber 71h and the like make up the outlet side switching valve set forth in claims.

Next, the operation of the safety valve is described below.

When the suction pressure of the compressor 10 is not exerted on the first back pressure chamber 71g and the second back pressure 71h, that is, when the compressor 10 is at rest, the refrigerant inlet side of the evaporator 40 is closed by the elastic force of the first coil spring 76 and the refrigerant outlet side of the evaporator 40 is closed by the elastic force of the second coil spring 77.

When the suction pressure of the compressor 10 is exerted on the first back pressure chamber 71g and the second back pressure chamber 71h, that is, when the compressor 10 is in operation, the pressure in both the back pressure chambers 71g and 71h is reduced by the suction pressure and the valve elements 73 and 75 are displaced in such a direction to reduce the volume of both the back pressure chambers 71g and 71h, therefore, the refrigerant inlet side and the refrigerant outlet side of the evaporator 40 open.

In the refrigerant path 74, that is, on the refrigerant outlet side of the evaporator 40, the refrigerant flows between the second valve element 75 and the second cylinder portion 71f.

Next, the general operation of the air conditioner is described below.

When the compressor 10 is started, the refrigerant inlet side and the refrigerant outlet side of the evaporator 40 open and the refrigerant circulates in order of the compressor 10 to the radiator 20 to the internal heat exchanger 60 to the expansion valve 30 to the evaporator 40 to the accumulator 50 to the internal heat exchanger 60 to the compressor 10. Therefore, the refrigerant, which has cooled the air which is blown into the compartment in the evaporator 40, dissipates the heat, which it has received, into outdoor air from the radiator 20.

When the start switch of the air conditioner is cut off, or when the refrigerant leak sensor 91 detects a refrigerant in a state in which the start switch of the air conditioner is turned on, the compressor 10 is stopped by shutting off the current to the electromagnetic clutch 11 and the refrigerant inlet side and the refrigerant outlet side of the evaporator 40 are closed.

Next, the function and effect of the present embodiment are described below.

According to the present embodiment, when the compressor 10 is stopped, the refrigerant inlet side and the refrigerant outlet side of the evaporator 40 are closed mechanically by the first coil spring 76 and the second coil spring 77, therefore, it is possible to minimize a refrigerant leak by the use of a less expensive means than the means described in "2. Description of the Related Art."

While the compressor 10 is at rest, as the refrigerant inlet side and the refrigerant outlet side of the evaporator 40 are closed, it is possible to prevent without fail the inside of a compartment from being filled with a large amount of refrigerant even if a refrigerant leak occurs when the ignition switch is cut off for a long period, such as when the vehicle is parked during the night, and power is not supplied to the refrigerant leak sensor 91 and the ECU 90.

(Other Embodiments)

Although carbon dioxide is used as a refrigerant in the above-mentioned embodiment, the present invention is not limited to this, but a flammable gas, such as a propane gas, may be used as a refrigerant. In this case, it is not necessary to raise the high pressure side refrigerant pressure to over the critical pressure.

Although the pressure-reducing means in the above-mentioned embodiment simply reduces the pressure of the refrigerant, the present invention is not limited to this, but the pressure reducing means may be, for example, an expansion machine, which reduces the pressure of refrigerant under a constant enthalpy, or a nozzle of an ejector.

Although the safety valve 70 is opened by utilizing the suction pressure of the compressor 10 in the above-mentioned embodiment, the present invention is not limited to this, and the safety valve 70 may be opened by utilizing the discharge pressure of the compressor 10.

Although the inlet side switching valve for opening and closing the refrigerant inlet of the evaporator 40 and the outlet side switching valve for opening and closing the refrigerant outlet side of the evaporator 40 are formed integrally in the above-mentioned embodiment, the present invention is not limited to this, and each switching valve may be separately formed.

Although the internal heat exchanger 60 is comprised in the above-mentioned embodiment, the internal heat exchanger 60 may be eliminated.

Figure 4:
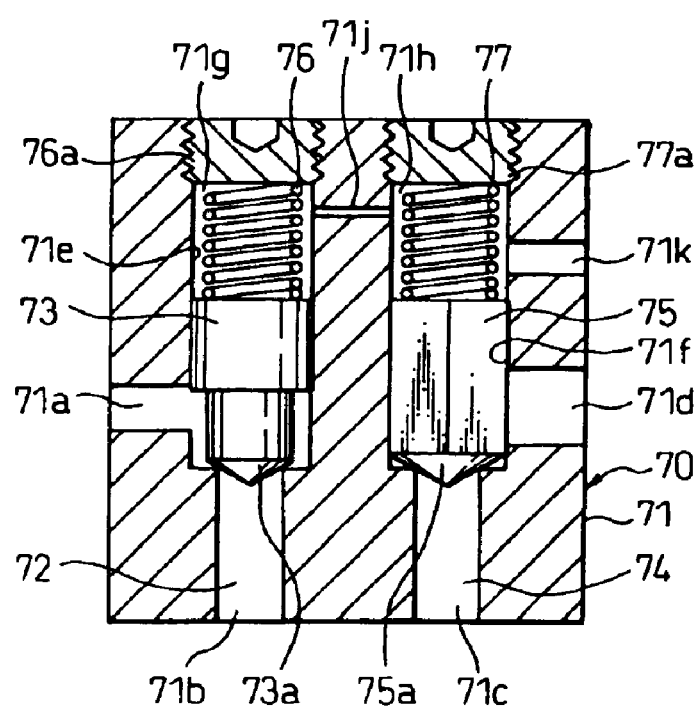
FIG. 4 is a diagram illustrating a safety valve according to another embodiment of the present invention.

Although the second valve element 75 is prism-shaped and the refrigerant flows between the second valve element 75 and the second cylinder port 71f, the present invention is not limited to this, and, for example, a dedicated port 71k which guides the suction pressure of the compressor 10 into the second back pressure chamber 71h may be provided, as shown in FIG. 4.

While the invention has been described by reference to specific embodiments chosen for the purposes of illustration, it should be apparent that numerous modifications could be made thereto by those skilled in the art without departing from the basic concept and scope of the invention.

What is claimed is:

1. An air conditioner comprising:

a compressor for sucking and compressing a refrigerant;

an outdoor heat exchanger for effecting heat exchange between a refrigerant and outdoor air;

a pressure-reducing means for reducing the pressure of and expanding a high pressure refrigerant;

an indoor heat exchanger for effecting heat exchange between a refrigerant and air which is blown into a compartment;

an inlet side switching valve for opening and closing a refrigerant path on the refrigerant inlet side of the indoor heat exchanger; and an outlet side switching valve for opening and closing a refrigerant path on the refrigerant outlet side of the indoor heat exchanger; wherein both the switching valves open the refrigerant paths by the use of the pressure produced by the compressor and close the refrigerant paths by the use of the elastic force of elastic means when the compressor comes to a stop.

2. An air conditioner, as set forth in claim 1, wherein both the switching valves close the refrigerant paths by the use of the suction pressure of the compressor.

3. An air conditioner, as set forth in claim 1, wherein the inlet side switching valve and the outlet side switching valve are formed integrally.

4. A switching valve for an air conditioner which comprises a compressor for sucking and compressing a refrigerant, an outdoor heat exchanger for effecting heat exchange between a refrigerant and outdoor air, a pressure reducing means for reducing the pressure of and expanding a high pressure refrigerant, and an indoor heat exchanger for effecting heat exchange between a refrigerant and air which is blown into a compartment;

opens and closes refrigerant paths on a refrigerant inlet side and a refrigerant outlet side of the indoor heat exchanger;

comprises valve elements for opening and closing the refrigerant paths, elastic means for exerting an elastic force on the valve elements in such a direction to close the refrigerant paths, and a valve body making up, together with the valve elements, back pressure chambers communicating with the suction side of the compressor;

and has a construction in which the refrigerant paths are opened when the valve elements are displaced in such a direction to reduce the volume of the back pressure chambers.

* * * * *